United States Patent
Siskin et al.

(10) Patent No.: US 8,343,315 B2
(45) Date of Patent: Jan. 1, 2013

(54) INTEGRATED SOLAR THERMAL AND NUCLEAR ENABLED WATER PURIFICATION AND HYDROCARBON REFINING PROCESSES

(75) Inventors: Michael Siskin, Westfield, NJ (US); Ramesh Varadaraj, Flemington, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 385 days.

(21) Appl. No.: 12/761,795

(22) Filed: Apr. 16, 2010

(65) Prior Publication Data

US 2010/0320071 A1 Dec. 23, 2010

Related U.S. Application Data

(60) Provisional application No. 61/268,775, filed on Jun. 16, 2009.

(51) Int. Cl.
*B01D 3/10* (2006.01)
(52) U.S. Cl. ........ 203/10; 203/21; 203/27; 203/DIG. 17
(58) Field of Classification Search .............. 203/10–11, 203/21–27, DIG. 17; 159/22–31; 208/177–369
See application file for complete search history.

(56) References Cited

U.S. PATENT DOCUMENTS

| 5,645,693 | A | | 7/1997 | Gode |
| 5,672,250 | A | | 9/1997 | Ambadar et al. |
| 5,772,850 | A | * | 6/1998 | Morris .......................... 202/237 |
| 6,984,292 | B2 | * | 1/2006 | Kresnyak et al. .................. 203/1 |
| 7,540,944 | B2 | * | 6/2009 | Bitterly et al. ................... 203/22 |
| 8,083,902 | B2 | * | 12/2011 | Al-Garni et al. .............. 202/234 |
| 2003/0150704 | A1 | * | 8/2003 | Posada ............................. 203/1 |
| 2005/0061653 | A1 | * | 3/2005 | Sandstad ........................ 203/10 |
| 2006/0231377 | A1 | * | 10/2006 | Costa ............................ 202/174 |
| 2010/0270170 | A1 | * | 10/2010 | Rosenbaum .................. 205/742 |

OTHER PUBLICATIONS

David Weight, "Concentrated Solar Power Plants in North Africa Could Supply Europe", www.bsdlive.co.uk/story; Jul. 2008, 6 pgs.
Dr. Franz Trieb, "Concentrating Solar Power for Seawater Desalination", MENAREC 4, Damascus, Syria, Jun. 20-24, 2007, pp. 1-12.

* cited by examiner

*Primary Examiner* — Duane Smith
*Assistant Examiner* — Thomas McKenzie
(74) *Attorney, Agent, or Firm* — Glenn T. Barrett; Malcolm D. Keen

(57) ABSTRACT

Saline waters are made suitable for use in large quantities in petroleum refining operations by evaporative desalination of a water source having a dissolved salt content of at least 30,000 ppmw with the heat liberated during the steam condensation used as low quality heat for petroleum refining operations. Sea water is most suitable for evaporative purification processes.

6 Claims, No Drawings

INTEGRATED SOLAR THERMAL AND NUCLEAR ENABLED WATER PURIFICATION AND HYDROCARBON REFINING PROCESSES

CROSS REFERENCE TO RELATED APPLICATIONS

This application relates and claims priority to U.S. Provisional Patent Application No. 61/268,775, filed on Jun. 16, 2009.

FIELD OF THE INVENTION

This invention relates to the purification of water by distillation and more particularly to distillation processes in which the heat released during the condensation step is used for other purposes.

BACKGROUND OF THE INVENTION

Many hydrocarbon refining processes require water intake (excluding once-through cooling water) that is free of salts and suspended solids and the amount of water required for refinery operations is large: typical refineries might, for example, require from about 25,000 to about 150,000 m³/day. River water and sea water as well as recycled municipal waste water may be used as sources for the required amounts of water and with the amounts of dissolved salts and suspended solids typically encountered with such sources, a heavy load is imposed on water purification plants. A typical refinery limitation on the total dissolved solids (TDS) in bulk waste water can be as low as 2,000 wppm. While filtration, for example, through sand beds, may be effective to remove suspended solids, removal of the dissolved salts presents more difficult problems. Water purification by reverse osmosis or evaporation is an energy intensive process and with recent increases in the cost of energy, by a factor of approximately three since the year 2000, reliance on conventional source becomes progressively less tenable.

Solar power has been proposed for desalination using either flat panel evaporators as in U.S. Pat. No. 5,672,250 or concentrated solar power as described in U.S. Pat. No. 5,645,693. Solar energy, plentifully available in certain areas of the world, has been proposed both for the generation of electrical energy and for the provision of potable water. See, for example, "Concentrating Solar Power for Seawater Desalination", Trieb, MENAREC 4, 20-24 Jun. 2007, estimating that the solar energy received on each square kilometer of desert land in the MENA region is sufficient to desalinate 165,000 m³/day of water, making such a plant capable of supplying the fresh water requirements of even a large petroleum refinery.

Refinery cooling tower systems will typically impose a concentration limit on total dissolved salts (TDS) of about 55,000 wppm at 50° C.; in the case of a typical seawater with 30,000 or 35,000 to 40,000 wppm TDS, repeated recycling through the cooling tower with these levels of dissolved salts cannot be accepted without resort to high blowdown rates. In addition, care must be taken in selecting the intake location to assure that the suspended solids do not exceed 200 wppm in the recirculated water.

The use of concentrated solar power or nuclear thermal energy presents an attractive option to the problem of providing desalinated water in large quantities for use in petroleum refineries. The primary advantages of using solar thermal or nuclear heat purified water in refining processes are:

a) fossil fuels such as natural gas or refined crude oil are not combusted for providing heat to the water purification process, thus leading to conservation of fossil fuel resources,
b) the carbon footprint of water purification is significantly reduced,
c) solar thermal or nuclear heat is available in sufficient quantity and quality to provide for water heat from the water purification to be utilized for other purposes.

SUMMARY OF THE INVENTION

According to the present invention, solar thermal or nuclear heat is used to desalinate by evaporation a water source having a dissolved salt content of at least 2,000 ppmw with the heat liberated during steam condensation to water used as low quality heat for petroleum refining operations. The coupling of the evaporative water purification process with refining processes enables the purified water to be used as process water with the low quality heat from the condensation of the steam in the water purification being used for refining operations. Sea water is most suitable for evaporative purification processes. Saline waters with very high dissolved salt levels, e.g. as high as the 30,000, 35,000 or 40,000 ppmw typical of sea waters may be effectively treated in this way.

DETAILED DESCRIPTION

Heat from a concentrated solar power (CSP) or nuclear thermal energy source may be supplied directly or indirectly to the evaporative water purification process. When solar energy sources provide the heat, the saline water may be passed directly through a solar furnace, e.g. at the focus of the furnace, to provide the heat directly or indirectly by heat exchangers passing a heat transfer medium from the solar source to the exchanger. With nuclear energy sources where circulation directly through the nuclear reactor is not possible, the feed water will be passed through heat exchangers fed from the nuclear reactor. The heat exchanger will normally be fed with heat transfer medium in a secondary loop heated in a heat exchanger with the nuclear reactor primary coolant in its own loop passing through the nuclear reactor core but if the primary coolant does not become radioactive in the reactor core, e.g. with helium in a gas-cooled reactor, the heat exchangers for the evaporation may be fed with the primary coolant.

Solar Thermal Energy Sources

Solar thermal energy is provided by the conversion of light to heat energy. This is typically achieved by focusing solar radiation onto a point source using mirrors, and the point source increases in temperature thus generating heat. For commercial applications, multiple mirrors are required to be installed to increase light capture. Once the solar radiation is focused on a point, the heat is transferred to fluid heat transfer medium. Three types of solar thermal device designs have been explored: solar tower, solar trough, and solar reactors.

Solar thermal installations with a tower design use mirrors to focus incoming solar radiation on to a point that is often located on a central tower. Typically, the mirrors in a heliostat system are motorized to follow the sun over the course of the day. At this focal point, a liquid heat transfer medium is heated to the required temperature. Solar trough power plants use curved, trough-shaped mirrors to focus light on to a heat transfer fluid that flows through a tube above them. These trough reflectors tilt throughout the day to track the sun for optimal heating. The heat transfer fluid is heated in the troughs and then flows to a heat exchanger, which is used to produce superheated steam. A modified version of the parabolic trough design, the Fresnel reflector design, is uses a series of flat mirrors with a number of heat transfer receivers. Solar reactors, or Concentrated Solar Power (CSP), are useful for applications such as the present that take advantage of the high-temperature capabilities of tower technology which uses reactors similar to closed volumetric receivers except that a rhodium or another catalyst is dispersed on the surface of the ceramic mesh, directly absorbing the solar energy to produce syngas, hydrogen, and carbon monoxide as disclosed by Moller, S. et al., in 2002: Solar production of syngas for electricity generation: SOLASYS Project Test-Phase, 11$^{th}$ SolarPACES International Symposium on Concentrated Solar Power and Chemical Energy Technologies, Zurich. In its application to the present invention a solar reactor is used for directly heating the heat transfer fluid to high temperatures.

The solar energy source may be augmented with natural gas or nuclear heat at times the solar thermal reactor output is diminished due to lack of availability of solar radiation.

Nuclear Thermal Energy Sources

The high temperatures required for the present invention can also be provided by certain nuclear thermal energy sources. While conventional light water reactors are not adequate to supply these high temperatures, high temperature gas-cooled reactors and others have appropriate characteristics. One example is the Toshiba 4S (super safe, small, and simple) nuclear power system is based on a low-pressure, liquid-sodium design which is therefore capable of supplying the required high temperatures. It can be transported in modules and installed in a building measuring 22×16×11 metres and therefore commends itself for appropriate adaptation to refinery usage. High-temperature gas-cooled reactors (HT-GRs) which typically use helium as a coolant are another next-generation reactor design that have the potential for driving endothermic chemical reactions, e.g., the regeneration reactions in the sulfur sorption cycle. One factor making HTGRs advantageous for the present application is that in principle the HTGCR can operate at temperatures well above 800° C., a range of refining operations including cracking, reforming and solid contact sulfur sorption as described above. The Siemens PBMR (the pebble bed modular reactor, or PBMR) is an example of a HTGCR which would be particularly useful for these purposes. The pebble bed modular reactor (PBMR) potentially meets US safety standards and includes a required airtight steel-lined reinforced-concrete containment structure. Operation of the PBMR is based on a single helium coolant loop, which exits the reactor core at 900° C. and 70 bar and therefore can be used to heat a heat transfer medium to comparable temperatures for use in refining processes. The PBMR is described in Weil, J., 2001: *Pebble-Bed Design Returns, IEEE Spectrum,* 38 (11), 37-40.

Heat Transfer From Source to Process Unit

As noted above, the heat from solar sources may be applied directly to the evaporator feed stream by passing it through heating coils in the solar furnace. In other cases, the heat from the solar or nuclear high temperature heat source will be applied by the use of a heat transfer medium and heat exchange device transferring the heat from the solar or nuclear power source to the reforming process unit. The heat transfer medium will be routed from the solar or nuclear source to a heat exchanger providing the heat to the evaporator, e.g. by passing the heat exchange medium through the interior of a plate type evaporator, to the heating coils of a multi-effect evaporator. Heat from solar and nuclear heat sources at temperatures potentially in excess of 1500° C. and heat of this quality can be used very effectively to provide the evaporation heat requirement, even when transferring heat to the water indirectly through a heat exchanger. Heat transfer at the high temperatures, typically above 800° C. and ideally higher, e.g. 900, 1000° C., even as high as 1500° C., can be effected using transfer media such as liquids, gases, molten salts or molten metals although molten salts and molten metals will often be preferred for their ability to operate at the very high temperatures required for high energy densities without phase changes; in addition, corrosion problems can be minimized by appropriate choice of medium relative to the metallurgy of the relevant units. Molten salt mixtures such as mixtures of nitrate salts, more specifically, a mixture of 60% sodium nitrate and 40% potassium nitrate are suitable but other types and mixtures of molten salts may be used as a heat transfer and a thermal storage medium. Liquid metals such as sodium as well as alloys such as sodium-potassium alloy, bismuth alloys such as Woods metal, (m.p. 70° C.) and alloys of bismuth with metals such as lead, tin, cadmium and indium; the melting point of gallium (30° C.) and its alloys would, but for the aggressiveness of this metal towards almost all other metals, generally preclude it from consideration. Mercury is excluded for environmental reasons. Hot helium from a HTGCR can be used in a single loop heat exchange circuit from the nuclear reactor to the hydrocarbon process unit since helium is incapable of becoming radioactive and HTGCR reactor design is inherently safe: in the event of a loss of coolant, the temperature in the core will increase until Doppler broadening leads to a breakdown in the fission chain reaction. Outlet temperature and pressure for the helium coolant of the HTGCR are 850° C. and 70 bar, respectively, making it suitable for the present purposes. If required for safety or other reasons, the primary heat exchange fluid can be used to heat a secondary heat exchange fluid in a secondary circuit with this secondary fluid passing to the hydrocarbon process unit.

Evaporative Purification

The evaporator is typically a multi-effect evaporator using up to four stages for thermal efficiency but other types of evaporator may be used as desired provided that suitable modifications are made, as necessary, to accommodate the high temperatures of the heat supplied and the quality of the feed water, e.g. depending on whether the water has a relatively low dissolved salt content around 2,000 to 3,000 ppm or, alternatively, is a sea water with a high level of dissolved salts, e.g. 30,000-40,000 ppm. The steam produced will normally be at a high temperature if the full capabilities of the CSP or nuclear heat are fully exploited and accordingly, a partial condensation may be effected by expansion of the steam through a power turbine prior to the final condensation step with the power from the turbine used to generate electricity or directly run rotary machinery. Finally, the steam will be condensed in a condenser to provide water with a low level of residual dissolved salts.

The evaporation is conducted in such a manner that the remaining brine concentrate remains capable of being handled as a liquid or slurry. A concentration gauge on the evaporator may be used to provide automatic process control so that the feed rate and/or evaporation rate are controlled to maintain the desired concentration in the discharge brine stream. The hot brine discharge stream may be mixed prior to discharge into the environment with cool sea or river water to minimize the heat/salinity plume from the purification unit. The selected concentration may be based on the construction of the unit including its metallurgy since the hot brine is corrosive and if sufficiently concentrated into a salt slurry, may also be abrasive. Consideration should also be given to the ability of the environment into which the discharge is being made to accept the discharge brine without unacceptable consequences.

Secondary Thermal Energy Utilization

During the evaporative purification process, the water is converted to steam by the heat from the CSP or nuclear thermal energy source with the steam being available at a high temperature as noted above. When this steam is condensed back into water, the heat given up on condensation is employed for providing process heat directly to a refining operation, e.g. as low or medium pressure steam to be supplied to feed pre-heaters, heat exchangers, reactor heating jackets, tracing, etc. In this way, the heat originally supplied by the CSP or nuclear thermal energy source is fully utilized within the refinery.

The invention claimed is:

1. A process for purifying a sea water having a dissolved salt content of at least 30,000 ppmw which comprises evaporating the water in an evaporator supplied with a heat transfer medium at a temperature above 800° C. from a concentrated solar power or nuclear thermal energy source to produce steam at high temperature and a discharge stream comprising a hot brine concentrate capable of being handled as a liquid or slurry and condensing the steam to form desalinated water with a dissolved salt content of not more than 1,000 ppmw while liberating heat during the condensation, and passing the heat liberated during the condensation of the steam to at least one petroleum refining operation by means of a feed pre-heater, heat exchanger, or reactor heating jacket to provide process heat directly to the refining operation.

2. A process according to claim 1 in which the saline water is evaporated in a multi-effect evaporator.

3. A process according to claim 2 in which the multi-effect evaporator has four stages.

4. A process according to claim 1 in which the evaporated steam is partially condensed by expansion through a power turbine prior to condensation to water.

5. A process according to claim 1 in which the discharge stream is mixed prior to discharge into the environment with cool sea or river water.

6. A process according to claim 1 in which the heat liberated during the condensation of the steam is used to generate low to medium pressure steam which, in turn, is fed to the refining operation.

* * * * *